(12) United States Patent
La Forest et al.

(10) Patent No.: US 8,003,026 B2
(45) Date of Patent: Aug. 23, 2011

(54) PITCH-ONLY DENSIFICATION OF CARBON-CARBON COMPOSITE MATERIALS

(75) Inventors: Mark La Forest, Granger, IN (US); Neil Murdie, Granger, IN (US); David R. Cole, North Liberty, IN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/128,338

(22) Filed: May 28, 2008

(65) Prior Publication Data

US 2009/0297707 A1 Dec. 3, 2009

(51) Int. Cl.
C01B 31/00 (2006.01)
(52) U.S. Cl. ............. 264/29.5; 264/103; 264/29.1
(58) Field of Classification Search .......... 264/29.5, 264/103, 29.1
See application file for complete search history.

(56) References Cited

U.S. PATENT DOCUMENTS

| | | | |
|---|---|---|---|
| 6,323,160 B1 | 11/2001 | Murdie et al. | |
| 7,172,408 B2 | 2/2007 | Wood et al. | |
| 2004/0195712 A1 | 10/2004 | La Forest et al. | |
| 2005/0266118 A1 | 12/2005 | La Forest et al. | |
| 2005/0266220 A1 | 12/2005 | La Forest et al. | |
| 2006/0261504 A1* | 11/2006 | Simpson et al. | 264/29.1 |

FOREIGN PATENT DOCUMENTS

| | | |
|---|---|---|
| EP | 1 724 245 A1 | 11/2006 |
| EP | 1 731 292 A2 | 12/2006 |
| WO | WO-2005/016476 A2 | 2/2005 |
| WO | WO 2005/116476 A2 | 12/2005 |

OTHER PUBLICATIONS

European Search Report from corresponding EP Application No. 09161254,9, mailed Oct. 8, 2009, 3 pages.
European Examination Report from corresponding EP Application No. 09161254.9, mailed Jun. 1, 2010, 7 pages.

* cited by examiner

*Primary Examiner* — Christina Johnson
*Assistant Examiner* — Larry Thrower
(74) *Attorney, Agent, or Firm* — Shumaker & Sieffert, P.A.

(57) ABSTRACT

Method for making carbon-carbon composite friction product, by: fabricating carbon fiber preform; heat-treating the carbon fiber preform; infiltrating the carbon fiber preform with a high carbon-yielding pitch using VPI (vacuum pressure infiltration) or resin transfer molding (RTM) processing; carbonizing the preform with an intermediate heat-treatment at 800-2000° C.; repeating the pitch infiltration and carbonization steps to achieve a final density of >1.75 g/cc; machining the surfaces of the preform; and applying an oxidation protection system. This approach overcomes problems inherent in lower density carbon-carbon composites by employing high carbon-yielding pitches to densify the carbon-carbon composites to a high density. The high carbon yielding pitches may include isotropic pitches, 100% anisotropic (mesophase) pitches, or mixtures of the two. They may be derived from petroleum, coal tar, or synthetic feedstocks.

9 Claims, 1 Drawing Sheet

U.S. Pat. No. 8,003,026 B2

PITCH-ONLY DENSIFICATION OF CARBON-CARBON COMPOSITE MATERIALS

FIELD OF THE INVENTION

This invention relates to the manufacture of carbon-carbon composite materials, and especially to the manufacture of aircraft brake discs made of improved carbon-carbon composite materials.

BACKGROUND OF THE INVENTION

The brake discs of most wide-body commercial and military aircraft are made from Carbon-Carbon (C—C) composites. Traditionally, C—C composites used as friction materials are produced by combining carbon fibers with a carbon matrix material that is deposited around the fibers using a Chemical Vapor Infiltration (CVI) process.

Unfortunately, this CVI process is expensive, capital intensive and is a time-consuming process, frequently taking several months to complete. Therefore, several attempts have been made to reduce the cycle time and costs associated with CVI processing by using lower cost pitches together with VPI and RTM processes. The problem with using these densification processes is the length of cycle time (typically about 5 cycles) and low final densities (often less than or less than 1.75 g/cc. Also, coal tar pitch feedstocks exhibit high variability in properties and composition that may cause variation in the properties and performance of the carbon-carbon composite.

This invention describes a method to produce C—C composites with improved density (about 1.8 grams per cubic centimeter or higher) and associated properties (mechanical and thermal) as well as friction and wear performance.

Background prior art includes the following documents: U.S. Pat. No. 7,172,408 B2, entitled RAPID DENSIFICATION OF POROUS BODIES (PREFORMS) WITH HIGH VISCOSITY RESINS OR PITCHES USING A RESIN TRANSFER MOLDING PROCESS; US 2006/0261504 A1, entitled CARBON-CARBON COMPOSITE PREFORM MADE WITH CARBON FIBER AND PITCH BINDER; US 2005/0266118 A1, entitled PROCESS AND APPARATUS FOR THROUGH THICKNESS INFILTRATION WITH MOLTEN RESIN; US 2004/0195712 A1, entitled DELIVERY OF PITCH/THERMOPLASTIC/THERMOSET RESINS IN RTM SYSTEMS; EP 173292 A2, entitled CARBON FIBER PREFORM DENSIFICATION BY PITCH INFILTRATION FOLLOWED BY RESIN TRANSFER MOLDING; and WO 2005/116476 A2, entitled REUSABLE CORE CARBON-CARBON COMPOSITE BRAKE DISC.

US 2006/0261504 A1, entitled CARBON-CARBON COMPOSITE PREFORM MADE WITH CARBON FIBER AND PITCH BINDER, claims a process for producing a carbon-carbon composite preform which comprises: providing short carbon fiber segments or short carbon fiber precursor segments; providing pitch in particulate form; combining blend comprising the fiber segments and pitch particles in a mold; subjecting the resulting mixture of fibers and pitch in the mold to an elevated pressure ranging at a temperature above the melting/softening point of the pitch to create an uncarbonized preform; cooling the preform to below its softening point and removing it from the mold; placing the preform in a constraint fixture; and carbonizing the combined components in the constraint fixture at an elevated temperature for a period of time of sufficient to provide a preform having a density in the range 0.8-1.6 grams per cubic centimeter.

U.S. Pat. No. 6,323,160 B1, entitled CARBON-CARBON COMPOSITE MATERIAL MADE FROM DENSIFIED CARBON FOAM, discloses a carbon-carbon composite material made by providing an open-celled carbon foam preform and densifying the preform with carbonaceous material. The open-celled carbon foam preform may be oxygen stabilized prior to carbonization, and the foam preform may be densified by CVD, HIP, PIC, VPI, pitch and resin injection, or any combination thereof. The carbon-carbon composite material may be heat treated to provide thermal management materials, structural materials, or a friction material for use in a brake or clutch mechanism.

SUMMARY OF THE INVENTION

The present invention overcomes problems inherent in lower density carbon-carbon composites—such as inferior thermal and mechanical properties, the potential for antioxidant migration away from the non-friction surfaces of the composite, and higher wear rates—by employing high carbon-yielding pitches to densify the carbon-carbon composites to a density of approximately 1.8 g/cc or greater. The high carbon yielding pitches which may be used in accordance with the present invention may include isotropic pitches, 100% anisotropic (mesophase) pitches, or mixtures of the two. They may be derived from petroleum, coal tar, or synthetic feedstocks. One advantage of using the mesophase pitches is the uniformity of composition that they impart to the composites, which results in reduced variation in C—C composites properties and performance.

This invention provides a method for making a carbon-carbon composite friction product such as an aircraft brake disc. This invention includes a series of sequential steps.

The first step—step (a)—is the fabrication of a carbon fiber preform. The carbon fiber preform (step a) may be, for instance, a non-woven fiber preform made from PAN and/or pitch fibers, or may be comprised of randomly oriented chopped fibers or may be comprised of chopped fibers where some fraction of fibers have a preferred orientation.

The second step—step (b)—involves heat-treating the carbon fiber preform at a temperature in the range 1400-2540° C.

The third step—step (c)—requires infiltrating the heat-treated carbon fiber preform with a high carbon-yielding pitch using VPI (vacuum pressure infiltration) or resin transfer molding (RTM) processing. The pitch used in step (c) may be, for instance, a mesophase pitch derived from coal-tar, petroleum, or a synthetic source, or may be a high char yield isotropic pitch derived from coal-tar, petroleum, or synthetic feedstocks.

An optional fourth step—step (d)—involves stabilization of the high char-yielding pitch-infiltrated preform.

The fifth step—step (e)—is carbonization of the preform, with an intermediate heat-treatment at 800-2000° C.

The next step—step (f)—is actually a repetition of steps (c) and (d) and (e) a sufficient number of times to impart a density of more than 1.75 g/cc to the carbon-carbon composite friction product being produced. Typically, at least two repetitions are carried out, for a total number of iterations of steps (c)-(e) of three. Of course, more repetitions may be carried out in order to impart a significantly higher density to the composite. For instance, one may carry out a $4^{th}$ densification step employing high char yield pitch, low to medium char yield pitch, CVD, or phenolic resin densification to impart a final density to the carbon-carbon composite friction product of 1.8 g/cc or greater.

Following repetition "step" (f), the next step—step (g)—is an optional densification of the composite employing CVI processing prior to final heat-treatment and machining. In those embodiments in which this CVI processing step is employed, the CVI process may be controlled to obtain a desired CVI microstructure such that the carbon-carbon composite: (i.) has a rough laminar microstructure and is densified, for example at a temperature of 1275° C., a pressure of 210 Torr, and a C/H ratio of 1/4; (ii.) has a smooth laminar microstructure and is densified, for example at a temperature of 1200° C., a pressure of 630 Torr, and a C/H ratio of 1/4; or (iii.) has an isotropic microstructure and is densified, for example at a temperature of 1425° C., a pressure of 630 Torr, and a C/H ratio of 1/4.

The next step—step (h)—involves optionally heat-treating the preform at 1400-2000° C.

At this point, the surfaces of the fully-densified carbon-carbon composite preform are machined—in step (i).

Finally, an oxidation protection system is applied to the composite preform to make it ready for use in its ultimate application, typically as an aircraft brake disc.

In an alternative embodiment of the present invention, the carbon-carbon composite friction product being manufactured is intended for use in an application in which low friction and low wear rates are desired. In this embodiment, no final heat treatment step (h) is carried out.

DETAILED DESCRIPTION OF THE INVENTION

Figure 1:
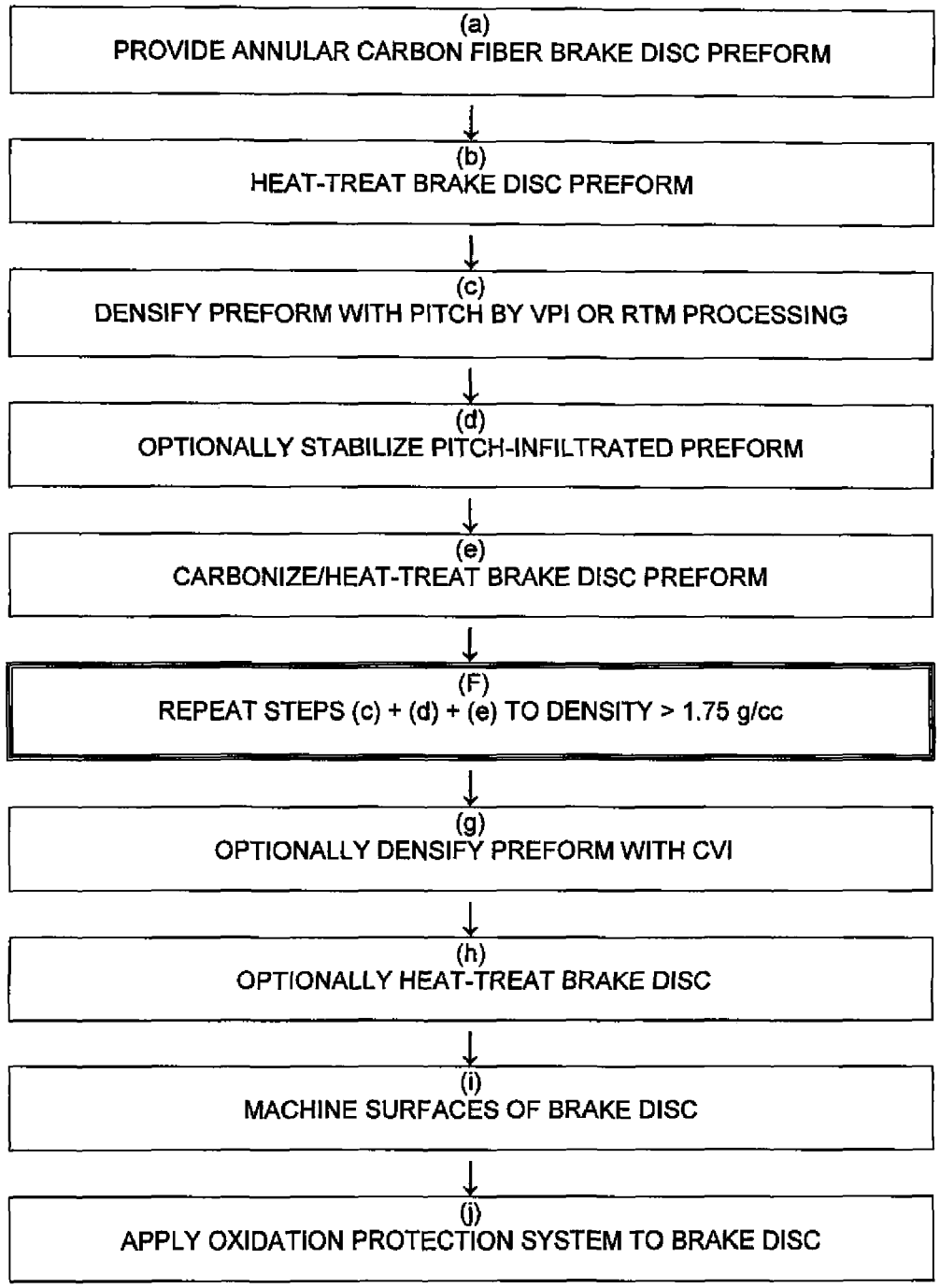
FIG. 1 is a flowchart depicting sequential processing steps of the present invention.

The present invention makes use of processing modules which are known in themselves. The advantages provided by the present invention lie in the selection and ordering of known processing modules to improve the friction and wear performance of the C—C composite brake discs prepared in accordance with this invention as compared with standard pitch-infiltrated brake discs. The present invention may also improve the economics of disc manufacture. Various "modules" that may be used in accordance with the present invention are summarized below.

The present invention was developed to provide C—C composites having a high final bulk density (greater than~1.8 g/cc) and to thereby provide improved properties as well as friction and wear performance of the composite material.

To achieve such high densities, high char yield pitches are used to densify the carbon fiber preforms. These high char yielding itches may be comprised of isotropic or anisotropic (mesophase) pitches obtained from petroleum, coal tar, or synthetic feedstocks. Mixtures of isotropic and mesophase pitches may also be used for the densification cycles.

In most instances, a final density of approximately 1.8 g./cc is achieved with 3 cycles of pitch densification using the high char yield pitches. In some instances, where larger, thicker preforms are used, additional cycles of densification may be required. In these instances, the high char yielding resin may optionally be replaced with either CVD, low to medium char yield pitch, or phenolic resin. Also, throughout the process, one or more of the high char yield pitch densification cycles may be replaced by CVD densification.

Heat Treatment

Intermediate and/or final heat treatment of the preforms is usually applied to modify the crystal structure of the carbon. Heat treatment is employed to modify the mechanical, thermal, and chemical properties of the carbon in the preform. Heat treatment of the preforms is typically conducted in the range of 1400° to 2800° C. The effect of such a treatment on graphitizable materials is well known. Higher temperatures increase the degree of crystalline order in the carbon material, as measured by such analytical techniques as X-ray diffraction or Raman spectroscopy. Higher temperatures also increase the thermal conductivity of the carbon in the products, as well as the elastic modulus, and typically result in lower wear rates.

VPI

Vacuum Pressure Infiltration ("VPI") is a well known method for impregnating a resin or pitch into a preform. The preform is heated under inert conditions to well above the melting point of the impregnating pitch. Then, the gas in the pores is removed by evacuating the preform. Finally, molten pitch is allowed to infiltrate the part, as the overall pressure is returned to one atmosphere or above. In the VPI process a volume of resin or pitch is melted in one vessel while the porous preforms are contained in a second vessel under vacuum. The molten resin or pitch is transferred from vessel one into the porous preforms contained in the second vessel using a combination of vacuum and pressure. The VPI process typically employs resin and pitches which possess low to medium viscosity. Such pitches provide lower carbon yields than do mesophase pitches. Accordingly, at least one additional cycle of pitch infiltration of low or medium char-yield pitch (with VPI or RTM processing) is usually required to achieve a final density of 1.7 g/cc or higher.

RTM

Resin Transfer Molding ("RTM") is an alternative to the use of VPI for the production of polymer-based composites. In Resin Transfer Molding, a fibrous preform or mat is placed into a mold matching the desired part geometry. Typically, a relatively low viscosity thermoset resin is injected at low temperature (50 to 150° C.) using pressure or induced under vacuum, into the porous body contained within a mold. The resin is cured within the mold before being removed from the mold. U.S. Pat. No. 6,537,470 B1 (Wood et al.) describes a more flexible RTM process that can make use of high viscosity resin or pitch. The disclosure of U.S. Pat. No. 6,537,470 B1 is incorporated herein by reference.

Stabilization/Carbonization

Carbonization refers to the heating of carbon materials in an inert atmosphere to temperatures typically between 700 and 1600° C. The purpose of carbonization in the manufacture of carbon-carbon composites from fibers, pitches, etc. is to remove non-carbon elements such as H, N, O, S, and other impurities from the pitch matrices to form a solid, carbon rich matrix. During carbonization, the volatiles from the pitch are released and porosity is generated in the composite, which has to be filled with pitch during subsequent pitch densification cycles.

A stabilization step may be conducted to rigidize the pitch and prevent exudation from the preform during subsequent carbonization processing. The stabilization step may be oxidative stabilization carried out at a temperature of about 150-250° C. to rigidize the pitch and prevent its exudation during carbonization. Alternatively, mechanical or gaseous pressure can be used during carbonization, with or without a containment vessel, to prevent the preform from bloating and to limit the amount of pitch exudate. In some instance, the pitch-densified preforms do not require stabilization prior to carbonization. In such cases, the preforms are typically restrained and/or contained to limit the amount of pitch exudate.

Machining the Surfaces of the Preform

Standard machining processes, well know to persons skilled in the art of manufacturing carbon-carbon composite brake discs, are used in the manufacture of the carbon-carbon composite friction discs provided by the present invention. Between densification processing steps, the surfaces of the annular discs are ground down to expose porosity in the surfaces. Once the final density is achieved, the annular discs are ground to their final thickness using standard grinding equipment to provide parallel flat surfaces, and then the inside diameter and outside diameter regions are machined, typically using a CNC (computer numerical control) Mill to provide the final brake disc geometry, including such features as rivet holes and drive lugs.

CVD/CVI

Chemical vapor deposition (CVD) of carbon is also known as chemical vapor infiltration (CVI). In a CVD/CVI process, carbonized, and optionally heat treated, preforms are heated in a retort under the cover of inert gas, typically at a pressure below 100 torr. When the parts reach a temperature of 900° to 1200° C., the inert gas is replaced with a carbon-bearing gas such as methane, ethane, propane, butane, propylene, or acetylene, or combinations of these gases. When the hydrocarbon gas mixture flows around and through the porous structures, a complex set of dehydrogenation, condensation, and polymerization reactions occur, thereby depositing the carbon atoms within the interior and onto the surface of the porous structures. Over time, as more and more of the carbon atoms are deposited onto the structures, the porous structures become more dense. This process is sometimes referred to as densification, because the open spaces in the porous structures are eventually filled with a carbon matrix until generally solid carbon parts are formed. Depending upon the pressure, temperature, and gas composition, the crystallographic structure and order of the deposited carbon can be controlled, yielding anything from an isotropic carbon to a highly anisotropic, ordered carbon. US 2006/0046059 A1 (Arico et al.), the disclosure of which is incorporated herein by reference, provides an overview of CVD/CVI processing.

Oxidative Protection

The carbon in carbon fiber and C—C composites tends to oxidize when exposed to air or other oxidizing environments when the temperature exceeds approximately 300° C. When the carbon oxidizes, it loses mass, due to the formation of $CO_2$ and CO gases as oxidation products. This loss in mass leads directly to loss of mechanical strength, as well as loss of integrity, functionality, and ultimately to the failure of the component. In order to protect the C—C components from oxidization when they are subjected to repeated or sustained high temperatures, barrier coatings are generally applied to the components. U.S. Pat. Nos. 6,913,821 and 7,160,618, both of which are incorporated herein by reference, provide more background on the oxidative protection of carbon-carbon composites.

EXAMPLES

Specific embodiments of the present invention may employ the following densification cycles (1) Pitch-Only Densification:
Fabricating a carbon fiber preform,
heat-treating the carbon fiber preform at 1400-2540° C.,
infiltrating the carbon fiber preform with a high carbon-yielding pitch using VPI (vacuum pressure infiltration) or resin transfer molding (RTM) process,
optionally stabilize the high char-yielding pitch-infiltrated preform,
repeating the infiltration step and optionally the stabilization step to achieve a final density of >1.75 g/cc (and usually above 1.8 g/cc),
heat-treating the preform at 1400-2000° C., machining the surfaces of the preform, and
applying an oxidation protection system.

(2) Densification with Pitch and CVI/CVD:
Fabricating a carbon fiber preform,
heat-treating the carbon fiber preform at 1400-2540° C.,
infiltrating the carbon fiber preform with a high carbon-yielding pitch using VPI (vacuum pressure infiltration) or resin transfer molding (RTM) process,
optionally stabilize the high char-yielding pitch-infiltrated preform, repeating the infiltration step and optionally the stabilization step to achieve a density of approximately 1.6 g/cc,
optionally grinding the surfaces of the preform prior to CVI densification to achieve a final density of >1.75 g/cc (and usually above 1.8 g/cc)
optionally heat-treating the densified preform at 1400-2540° C., machining the surfaces of the preform to their final dimensions, and
applying antioxidant solution to the machined preform and baking it on.

The resultant carbon-carbon composites have high density (>1.75 g/cc and usually above 1.8 g/cc) and improved thermal and mechanical properties compared with other C—C composites. The higher density is also advantageous in reducing the oxidation of the carbon and providing improved friction and wear performance.

Further examples of variants of the invention are summarized in the following table:

| preform | initial carbonization/ heat treatment ° C. | densification step 1 | densification step 2 | densification step 3 | final heat treatment ° C. |
|---|---|---|---|---|---|
| nonwoven fabric | 1600 | mesophase pitch by RTM | mesophase pitch by RTM | mesophase pitch by RTM | 1600 |
| nonwoven fabric | 1800 | mesophase pitch by RTM | high char yield isotropic pitch by RTM | mesophase pitch by RTM | 1800 |
| nonwoven fabric | 2000 | mesophase pitch by RTM | mesophase pitch by VPI | high char yield isotropic pitch by RTM | 2540 |

-continued

| preform | initial carbonization/heat treatment °C | densification step 1 | densification step 2 | densification step 3 | final heat treatment °C |
|---|---|---|---|---|---|
| nonwoven fabric | 2540 | mesophase pitch by RTM | high char yield isotropic pitch by RTM | mesophase pitch by VPI | 2000 |
| nonwoven fabric | 1400 | high char yield isotropic pitch by RTM | mesophase pitch by RTM | CVD | 1600 |
| nonwoven fabric | 1600 | mesophase pitch by VPI | high char yield isotropic pitch by RTM | CVD | 1800 |
| nonwoven fabric | 1800 | mesophase pitch by VPI | high char yield isotropic pitch by RTM | mesophase pitch by VPI | 1600 |
| nonwoven fabric | 2000 | high char yield isotropic pitch by RTM | mesophase pitch by VPI | CVD | (no heat treatment) |
| chopped fiber | 1600 | mesophase pitch by RTM | high char yield pitch by VPI | mesophase pitch by VPI | 1800 |
| chopped fiber | 2540 | mesophase pitch by VPI | mesophase pitch by RTM | CVD | (no heat treatment) |

The present invention has been described herein in terms of preferred embodiments. However, obvious modifications and additions to the invention will become apparent to those skilled in the relevant arts upon a reading and understanding of the foregoing description. It is intended that all such modifications and additions form a part of the present invention to the extent that they fall within the scope of the several claims appended hereto.

What is claimed is:

1. A method comprising the sequential steps of:
   (i) heat-treating a carbon fiber preform at a temperature in the range of 1400-2540° C.;
   (ii) infiltrating the carbon fiber preform with a high char-yield pitch using at least one of a VPI (vacuum pressure infiltration) process or a RTM (resin transfer molding) process;
   (iii) stabilizing the high char-yield pitch-infiltrated preform;
   (iv) carbonizing the preform with an intermediate heat-treatment at 800-2000° C.;
   (v) infiltrating the carbon fiber preform with the high char-yield pitch using at least one of the VPI (vacuum pressure infiltration) process or the RTM (resin transfer molding) process;
   (vi) stabilizing the high char-yield pitch-infiltrated preform;
   (vii) carbonizing the preform with an intermediate heat-treatment at 800-2000° C.;
   (viii) infiltrating the carbon fiber preform with the high char-yield pitch using at least one of the VPI (vacuum pressure infiltration) process or the RTM (resin transfer molding) process;
   (ix) stabilizing the high char-yield pitch-infiltrated preform;
   (x) carbonizing the preform with an intermediate heat-treatement at 800-2000° C. to achieve a final density of more than 1.75 g/cc;
   (xi) machining the surfaces of the preform to form a carbon-carbon composite aircraft brake disc; and
   (xii) applying an oxidation protection system to the carbon-carbon composite aircraft brake disc,
   wherein the final density is achieved without chemical vapor deposition (CVD) or chemical vapor infiltration (CVI) processing.

2. The method of claim 1, wherein the carbon fiber preform comprises nonwoven fibers.

3. The method of claim 1, wherein the carbon fiber preform comprises chopped fibers.

4. The method of claim 1, wherein the high char-yield pitch is derived from at least one of a coal-tar feedstock, a petroleum feedstock, or a synthetic feedstock.

5. The method of claim 1, wherein the final density is achieved without a final heat treatment step.

6. The method of claim 1, wherein the final density is greater than 1.8 g/cc.

7. The method of claim 2, wherein the carbon fiber preform comprises at least one of a PAN (polyacrylonitrile) fiber or a pitch fiber.

8. The method of claim 1, wherein the high char-yield pitch comprises at least one of an isotropic pitch or a mesophase pitch.

9. The method of claim 1, wherein the final density is achieved using a pitch-only process.

* * * * *